Sept. 28, 1971   J. W. LEATHERS   3,608,382
FLUIDIC SPEED SENSORS
Filed July 1, 1969   2 Sheets-Sheet 1
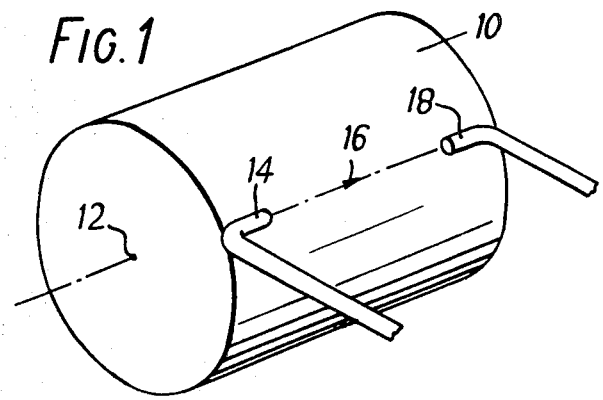
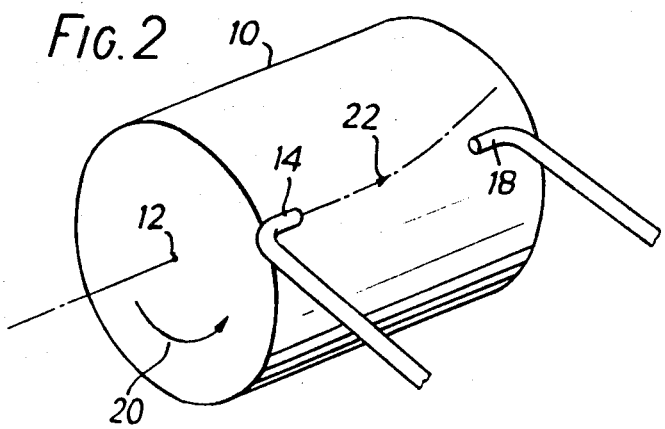
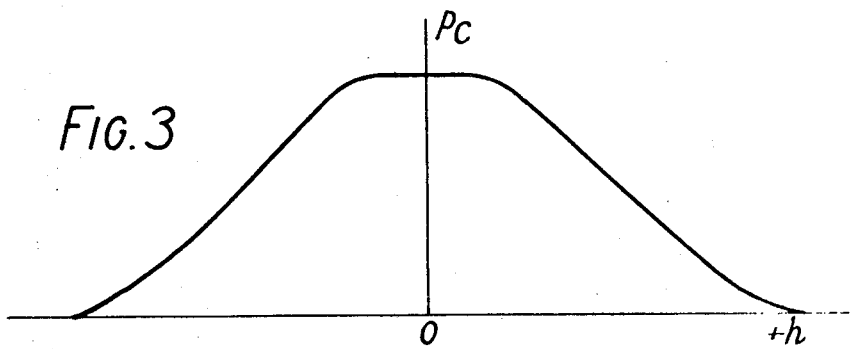
INVENTOR
JOHN WILLIAM LEATHERS
By Young & Thompson
Attys.

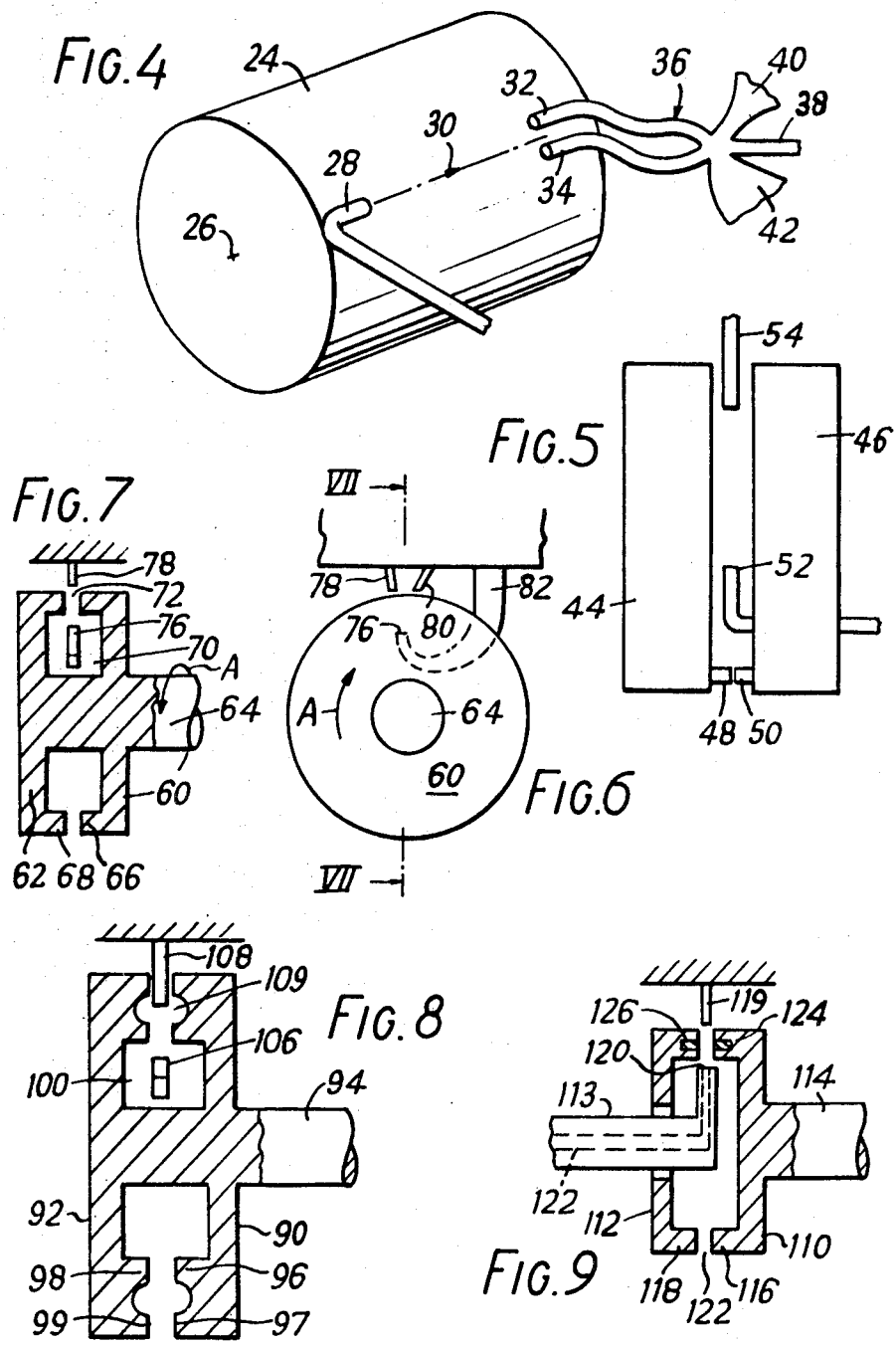

United States Patent Office 3,608,382
Patented Sept. 28, 1971

3,608,382
FLUIDIC SPEED SENSORS
John William Leathers, Taplow, England, assignor to British Telecommunications Research Limited, Taplow, England
Filed July 1, 1969, Ser. No. 838,249
Claims priority, application Great Britain, July 1, 1968, 31,329/68
Int. Cl. G01p 3/34
U.S. Cl. 73—521                                                  8 Claims

ABSTRACT OF THE DISCLOSURE

A jet of fluid is directed along the surface of a body whose spread of movement is to be measured in a direction which is parallel to the plane of such surface and perpendicular to the direction of movement. When the surface is moving, boundary layer interaction between the jet and the boundary layer of air or other fluid in contact with surface causes the jet to be deflected in the same direction as that of movement of the surface. A collector is disposed confronting the jet and, in accordance with whether the collector is aligned with the jet or whether it is displaced with respect to the jet in the direction of movement of the surface, a maximum signal output is received when the surface is stationary or when it is moving at a predetermined speed. The effective thickness of the boundary layer may be increased by providing two parallel surfaces moving in the same direction and at the same speed. The jet is then directed between the two surfaces.

---

This invention relates to speed-sensing devices and more particularly to fluidic speed-sensing devices; it has particular, but not exclusive, application to sensing rotational speeds.

It is an object of the invention to provide a fluidic speed-sensing device which is not susceptible to wear problems and which in particular, does not require seals to be maintained between relatively moving parts.

According to the invention, a fluidic speed-sensing device for sensing the speed of movement of a body having an operating surface, comprises a nozzle arranged to direct a jet of fluid into the boundary layer of the operating surface in a direction having a component perpendicular to the direction of movement of the body past the nozzle and parallel to the operating surface and a collector disposed confronting the nozzle, the operating surface being so shaped that the disposition thereof is unaffected by the movement of the body.

It should be understood that the term "boundary layer," as used herein, means the layer of fluid adjacent to a solid body in which movement in the same direction is caused by the movement of the body.

The invention will be more readily understood from the following description with reference to the accompanying drawings, in which:

FIG. 1 is a schematic isometric view of an embodiment of the invention for measuring the speed of rotation of a shaft, showing the shaft stationary;

FIG. 2 is a schematic isometric view similar to FIG. 1 but showing the shaft rotating;

FIG. 3 is a graph showing the relationship between output pressure and the rotation speed of the shaft as shown in FIGS. 1 and 2;

FIG. 4 is a schematic isometric view similar to FIG. 1 showing another embodiment of the invention;

FIG. 5 is a plan view of a further embodiment of the invention;

FIG. 6 is an elevational view of another embodiment of the invention;

FIG. 7 is a sectional view taken on the line VII—VII in FIG. 6;

FIG. 8 is a sectional view, similar to FIG. 2, of another embodiment of the invention; and FIG. 9 is a sectional view, similar to FIGS. 7 and 8, of a further embodiment of the invention.

Referring to FIG. 1, a cylindrical shaft 10 is mounted for rotation about its axis 12. A nozzle 14 is arranged to direct a jet of fluid, for example air, along the surface of the cylindrical shaft 10 parallel to the axis 12 thereof as shown by the chain-dotted line and arrow 16. A confronting collector 18 is aligned with the nozzle 14 to receive the jet of fluid therefrom. Referring now to FIG. 2, if the shaft rotates in the direction shown by the arrow 20, the jet of fluid from the nozzle is deflected as shown by the chain-dotted line 22. This is due to interaction between the fluid of the jet and the fluid forming the boundary layer with the moving surface of the cylindrical shaft.

FIG. 3 is a graph showing the relationship between the pressure $P_c$ of fluid at the collector 18 and the rate of rotation $h$ of the cylindrical shaft 10. It will be appreciated that rotation in the direction opposite to that shown by the arrow 20 is represented by negative values on the graph. It will be seen that the output pressure reaches a peak value when the rate of rotation is zero. This peak value can, of course, be shifted to correspond with any desired rate of rotation by angular displacement of the collector 18 about the axis 12 of the cylinder 10 so that the collector 18 is aligned with the centre of the displaced jets of fluid when the cylinder is rotating at the predetermined speed.

As shown in FIG. 3, the peak of the pressure response curve is relatively broad. Greater sensitivity can be achieved by using two collectors. Referring to FIG. 4, a cylindrical shaft 24 is mounted for rotation about its axis 26. A nozzle 28 is arranged to direct a jet of fluid along the surface of the cylindrical shaft 24 parallel to the axis 26 thereof as shown by the chain-dotted line and arrow 30. A pair of collectors 32 and 34 are disposed confronting the nozzle 28 with one disposed on each side of the centre line of the jet of fluid when the shaft is stationary. The spacing between the two collectors is arranged to be such that, when the output pressures are equal, indicating that the jet of fluid is directed mid-way between the 2 collectors 32 and 34, the rate of change of pressure at each of the collectors 32 and 34 with changes in rotation rates of the shaft 26 is relatively large. In other words the arrangement operates on the steep parts of pressure speed curves as shown in FIG. 3. Detection of the condition when pressures at the two collectors 32 and 34 are equal is effected by means of a fluidic momentum-interaction device 36. If the two pressures are equal, an output signal is received at the port 38 thereof. Otherwise fluid entering from the collectors 32 and 34 escapes through one or other of a pair of vents 40 and 42.

In the case of both the single collector and the two collector device, sensitivity tends to increase as the distance between the nozzle and collector or collectors is increased since the displacement of the jet of fluid is increased due to the greater distance travelled along the moving surface. However, the jet becomes more dispersed over such a greater distance and this tends to cause a decrease in sensitivity. In practice, there is an optimum distance between the nozzle and collector or collectors for a particular arrangement at which sensitivity is greatest.

Sensitivity can also be increased by increasing the effective thickness of the boundary layer of fluid adjacent to the shaft, optimum sensitivity being achieved when the boundary layer completely envelops the jet of fluid. The effective boundary layer thickness can be increased by roughening the surface of the shaft.

A further way of increasing sensitivity is to provide a second shaft parallel to the first and coupled in thereto for rotation in the opposite direction so that the confronting surfaces of the two shafts are moving in the same direction. Referring to FIG. 5, a pair of shafts 44 and 46 are mounted parallel to each other for rotation about their respective axes. A pair of idler wheels 48 and 50 are disposed between the two shafts, the idler wheel 48 engaging with the shaft 44, the idler wheel 50 engaging with the shaft 46 and the two idler wheels 48 and 50 engaging with each other so that rotation of one of the shafts 44 and 46 causes the other shaft to rotate at the same peripheral speed but in the opposite direction. Thus, confronting surfaces of the two shafts move in the same direction. A nozzle 52 is disposed between the two shafts and arranged to direct a jet of fluid parallel to the axes thereof and a collector 54 is aligned with the nozzle 52 to receive fluid therefrom. This arrangement has the advantage that the boundary layer effectively extends across the whole of the gap between the two shafts. This tends to reduce the dependence of deflection on external conditions such as temperature.

Another type of rotation speed sensor which provides two parallel rotating surfaces is illustrated in FIGS. 6 and 7.

In this arrangement a pair of discs 60 and 62 are mounted and secured to a shaft 64 whose speed of rotation is to be measured. Each disc 60, 62 has a respective annular lip 66, 68 on the periphery thereof confronting the other disc. Thus, two discs 60 and 62 almost totally enclose an annular cavity 70, the gap 72 between the lips 66 and 68 being narrow compared to the axial width of the cavity 70. A nozzle 76 is disposed within the cavity 70 and arranged to direct a jet of fluid radially outwards through the gap 72. A pair of collectors 78 and 80 are aligned confronting the gap 72 and disposed symmetrically with respect to the jet projection direction of the nozzle 76. When the shaft 64 and the discs 60, 62 thereon are stationary, the centre of the jet of fluid from the nozzle 70 impinges equally on the two collectors 78, 80 and the pressure thereat is therefore equal. If the shaft is rotated in the direction indicated by the arrow A, the pressure at the collector 80 increases and that at the collector 78 decreases.

In order to supply fluid to the nozzle 76, it is necessary to provide a supply pipe 82 leading through the narrow gap 72 between the two lips 66 and 68. This disturbs the flow in the gap but, if it is positioned as shown in FIG. 6, so that the bow wave in the fluid generated by the supply pipe 82 does not extend back to the jet, and if the overall circumference of the disc is such that there is room for the wake to settle before the collector 78 is reached, the effect on the output signal is negligibly small. The effect of the presence of the stationary jet 76 within the annular cavity 70 is minimised by giving the jet 76 and cavity 70 widely differing cross-sectional areas.

With the arrangements shown in FIGS. 6 and 7, if the collectors 78 and 80 are within or are close to the gap 72, they pick up disturbances from the edges of the discs 60 and 62. On the other hand, as the collectors are moved further from the edges of the discs 60 and 62, the effect of ambient conditions becomes more important. FIG. 8 shows an alternative arrangement comprising two discs 90 and 92 secured on a shaft 94. In this case, in addition to the lips 96 and 98 which define the sensing gap, and correspond to lips 66, 68 of FIGS. 6 and 7, each disc has an additional lip 97, 99 spaced radially outwards from and concentric with the first mentioned lips 96, 98. The nozzle 106 is disposed in the annular cavity 100 as before but the collectors, one of which is shown in 108, now extend into a second annular cavity 109 formed between the lips 96 and 98 on the one hand and the lips 97 and 99 on the other. Thus the collectors, although spaced away from the edges of the lips 96 and 98, are disposed within the fluid which is rotating at substantially the same speed as the discs and is effectively isolated from ambient conditions.

Referring now to the further modification shown in FIG. 9, only one disc 110 is rigidly mounted on the end of a shaft 114 whose speed of rotation is to be measured. A confronting disc 112 is mounted free for rotation on a coaxial fixed shaft 113. As before, confronting annular lips 116 and 118 are provided on the peripheries of the discs 110 and 112 respectively. A pair of collectors, one of which is shown at 119, and a nozzle 120 are disposed in similar positions to the collectors 78 and 80 and the nozzle 76 of the embodiment shown in FIGS. 6 and 7. However, the supply pipe 122 for the nozzle 120 is located within the fixed shaft 113 and consequently does not extend through the narrow gap 122 between the two confronting flanges 116 and 118.

In order to cause the disc 112 to rotate at the same speed as the disc 110, respective magnetic inserts 124 and 126 are mounted confronting one another in the flanges 116 and 118. Either one of the magnetic members 124 and 126 is a permanent magnet and the other is of soft magnetic material or both are permanent magnets mounted with poles of opposite polarity confronting one another.

The embodiment shown in FIG. 9 may be modified by the provision of double flanges to enclose the collectors in the same way as was described with reference to FIG. 8.

In any of the embodiments where two collectors are provided, the output may take the form of a differential output signal instead of a momentum interaction device being used.

In all the illustrated embodiments, the jet of fluid is directed parallel to the operating surface. As an alternative, the jet may be directed on to the surface at an angle and the collector or collectors aligned to receive the reflected jet. Preferably the jet should not be inclined to the plane of the surface at the point of incidence at an angle greater than 20°.

I claim:

1. A fluidic speed-sensing device for sensing the speed of rotation of a body having an operating surface symmetrical about the axis of rotation of the body, comprising a nozzle arranged to direct a jet of fluid along a discrete linear path into the boundary layer of the operating surface in a direction having a component perpendicular to the direction of movement of the surface past the nozzle and parallel to the operating surface and a collector disposed confronting the nozzle.

2. A fluidic speed-sensing device as claimed in claim 1, in which the collector is aligned with the nozzle whereby the proportion of the jet of fluid received by the collector is a maximum when the body is stationary.

3. A fluidic speed-sensing device as claimed in claim 1, in which the jet of fluid is arranged to be directed parallel to the operating surface.

4. A fluidic speed-sensing device as claimed in claim 1, in which the collector is disposed in a position displaced in a direction of movement of the operating surface from a position of alignment with the nozzle, whereby the proportion of the jet of fluid received by the collector is a maximum when the body is rotating at a predetermined speed.

5. A fluidic speed-sensing device as claimed in claim 1, in which first and second collectors are provided, each so disposed on a respective side of the jet of fluid when the body is rotating at a predetermined speed that an increase in such speed causes an increase in pressure at the first collector and a decrease in pressure at the second collector, and a decrease in such speed causes a decrease in the pressure of the first collector and an increase in pressure at the second collector.

6. A fluidic speed-sensing device as claimed in claim 1, in which the operating surface has a linear profile in a direction at right angles to the direction of movement thereof.

7. A fluidic speed-sensing device as claimed in claim 1, in which the body is cylindrical, the operating surface being the curved surface thereof.

8. A fluidic speed-sensing device as claimed in claim 7, in which a second operating surface comprising the curved surface of a second cylindrical body is disposed parallel to the first-mentioned operating surface and spaced apart therefrom, the nozzle being arranged to direct the jet of fluid between said two operating surfaces and the two cylindrical bodies being mounted for rotation in opposite senses about respective parallel axes.

References Cited
UNITED STATES PATENTS

| | | | |
|---|---|---|---|
| 3,371,540 | 3/1968 | Colombani et al. | 73—505 |
| 3,285,073 | 11/1966 | Egli | 73—505 |
| 3,311,987 | 4/1967 | Blazek | 73—505UX |

JAMES J. GILL, Primary Examiner

U.S. Cl. X.R.

73—523